(12) United States Patent
Hsu

(10) Patent No.: US 6,197,434 B1
(45) Date of Patent: Mar. 6, 2001

(54) GLAZING COVERED FERRITE CORE ELECTRODE TERMINAL OF A SURFACE MOUNTING INDUCTOR

(76) Inventor: Joseph M. E. Hsu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/480,705

(22) Filed: Jan. 7, 2000

(51) Int. Cl.[7] .............................. B32B 15/00; C25B 11/00
(52) U.S. Cl. .................. 428/615; 428/668; 428/669; 428/673; 428/678; 428/681; 204/279; 204/290 R
(58) Field of Search ..................... 438/615, 668, 438/669, 673, 678, 681; 204/280, 281, 290 R, 292

(56) References Cited

U.S. PATENT DOCUMENTS

| | | | |
|---|---|---|---|
| 3,638,147 | * 1/1972 | Denes | 333/79 |
| 5,153,549 | * 10/1992 | Morinaga | 336/177 |
| 5,358,514 | * 10/1994 | Schuluman et al. | 607/61 |
| 6,093,181 | * 8/2000 | Friese et al. | 204/424 |

\* cited by examiner

Primary Examiner—Timothy M. Speer
Assistant Examiner—Bryant Young

(57) ABSTRACT

A glazing covered ferrite core electrode terminal has a ferrite core, a glazing covered layer coated on a surface of the ferrite core, a silver paste layer disposed on the glazing covered layer, a nickel plated layer disposed on the silver paste layer, a solder plated layer disposed on the nickel plated layer, and a solder paste layer disposed on the solder plated layer.

1 Claim, 1 Drawing Sheet

GLAZING COVERED FERRITE CORE ELECTRODE TERMINAL OF A SURFACE MOUNTING INDUCTOR

BACKGROUND OF THE INVENTION

The present invention relates to a glazing covered ferrite core electrode terminal. More particularly, the present invention relates to a glazing covered ferrite core electrode terminal of a surface mounting inductor.

A conventional ferrite core electrode terminal is coated by a silver paste. Since a surface of the ferrite core electrode terminal has a plurality of gas spacings, some gas spacings will remain between the ferrite core electrode terminal and the silver paste. The silver paste will release from the ferrite core electrode terminal under high temperatures. Furthermore, the surface of the silver paste will be uneven so that a further soldering result will be poor.

SUMMARY OF THE INVENTION

An object of the present invention is to provide a glazing covered ferrite core electrode terminal which has a glazing covered layer to provide a smooth surface.

Another object of the present invention is to provide a glazing covered ferrite core electrode terminal which has a glazing covered layer disposed between a silver paste layer and a ferrite core so that an electroplating solution will not enter a surface of the ferrite core.

Another object of the present invention is to provide a glazing covered ferrite core electrode terminal which has a glazing covered layer, a silver paste layer, a nickel plated layer, a solder plated layer, and a solder paste layer to reinforce a ferrite core.

DETAILED DESCRIPTION OF THE INVENTION

Figure 1:
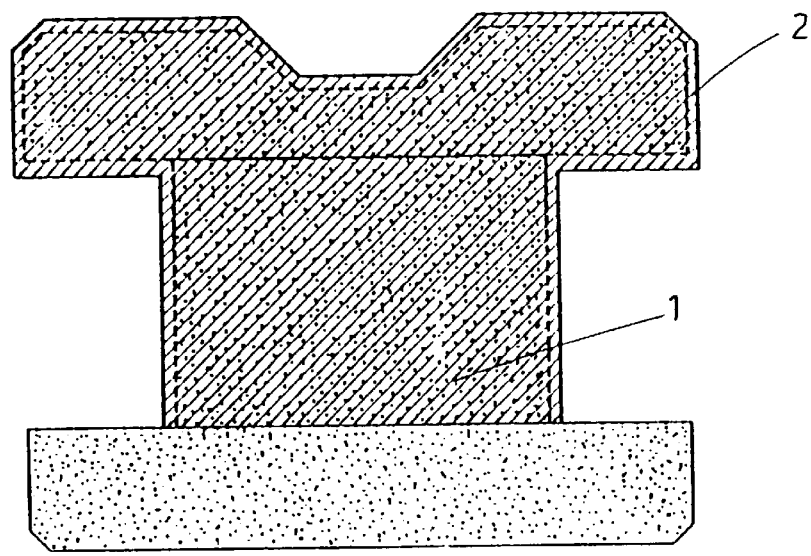
FIG. 1 is a schematic view illustrating a ferrite core of a preferred embodiment coated by a glazing covered layer.
Figure 2:
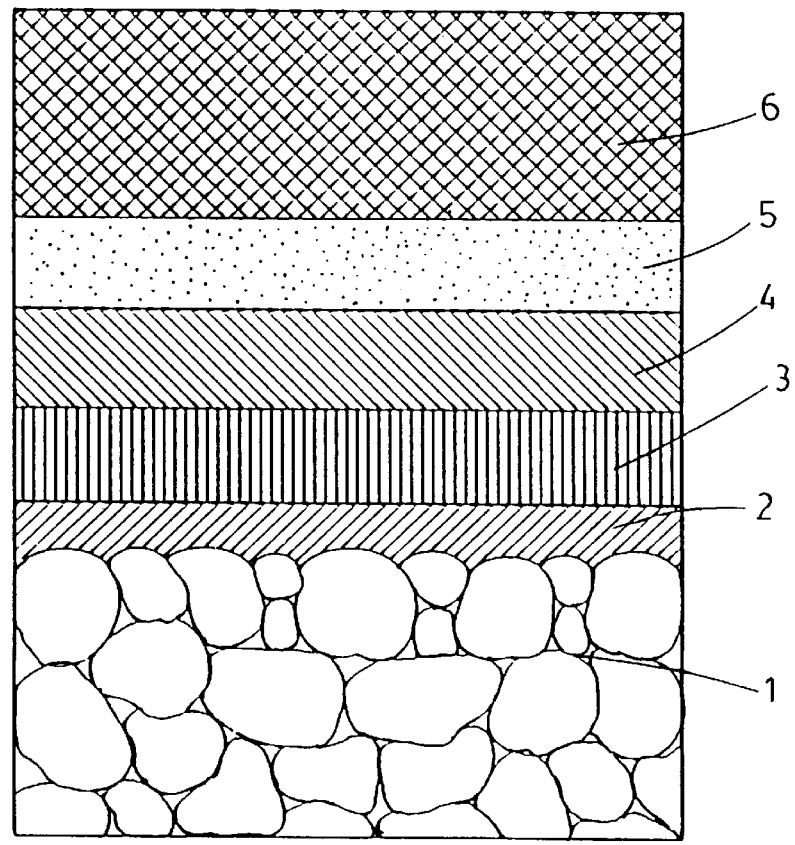
FIG. 2 is a sectional assembly view of a glazing covered ferrite core electrode terminal of a preferred embodiment in accordance with the present invention.

Referring to FIGS. 1 to 3, a glazing covered ferrite core electrode terminal comprises a ferrite core 1, a glazing covered layer 2 coated on a surface of the ferrite core 1, a silver paste layer 3 disposed on the glazing covered layer 2, a nickel plated layer 4 disposed on the silver paste layer 3, a solder plated layer 5 disposed on the nickel plated layer 4, and a solder paste layer 6 disposed on the solder plated layer 5.

The glazing covered ferrite core electrode terminal is processed by an infrared reflow method.

Since the glazing covered layer 2 is disposed between the silver paste layer 3 and the ferrite core 1, an electroplating solution of a further process will not enter the surface of the ferrite core 1.

The glazing covered layer 2, the silver paste layer 3, the nickel plated layer 4, the solder plated layer 5, and the solder paste layer 6 can reinforce the ferrite core 1.

The invention is not limited to the above embodiment but various modification thereof may be made. Further, various changes in form and detail may be made without departing from the scope of the invention.

I claim:

1. A glazing covered ferrite core electrode terminal comprises:

a ferrite core, a glazing covered layer coated on a surface of the ferrite core, a silver paste layer disposed on the glazing covered layer, a nickel plated layer disposed on the silver paste layer, a solder plated layer disposed on the nickel plated layer, and a solder paste layer disposed on the solder plated layer.

* * * * *